Nov. 22, 1966  A. S. NICHOLAS  3,287,063
RETRACTOR HOUSING

Filed Aug. 7, 1964

INVENTOR.
ARTHUR S. NICHOLAS
BY
*Price & Heneveld*
ATTORNEYS

Nov. 22, 1966  A. S. NICHOLAS  3,287,063
RETRACTOR HOUSING

Filed Aug. 7, 1964                                    5 Sheets-Sheet 2

INVENTOR.
ARTHUR S. NICHOLAS
BY
ATTORNEYS

Nov. 22, 1966 A. S. NICHOLAS 3,287,063
RETRACTOR HOUSING
Filed Aug. 7, 1964 5 Sheets-Sheet 4

INVENTOR.
ARTHUR S. NICHOLAS
BY
ATTORNEYS

United States Patent Office 3,287,063
Patented Nov. 22, 1966

3,287,063
RETRACTOR HOUSING
Arthur S. Nicholas, 1526 Groton Road SE.,
East Grand Rapids, Mich.
Filed Aug. 7, 1964, Ser. No. 388,242
5 Claims. (Cl. 297—388)

This invention relates to housings for storing vehicle safety belts and the retractor mechanisms which are now being used with these belts. In my application, Serial No. 344,727, now Patent No. 3,171,688, entitled, Receiver for Seat Belt Retractor, filed February 13, 1964, I disclosed a housing for seat belts adapted for use with the traveling type of retractor. That is, the retractor is not fixed in position and travels with the seat belt. This invention deals with housings for safety belts and the retractors in situations where the retractor itself is stationary and the belt is simply withdrawn from the retractor or permitted to rewind on the retractor. In the former case, the purpose of the housing was to provide an open topped receptacle into which the retractor could retreat for storage. In this case, the problem is to provide a protective housing for the retractor and an appropriate guide for the belt as it is extended and retracted. In guiding the belt, it prevents the belt from entering the retractor while twisted or misaligned, eliminating the problem of malfunction of the retractor.

In addition to this, it provides a protective casing for the retractor and the adjacent end of the retracted belt. This protects the webbing of the belt and the retractor from injury due to physical contact with other objects and it shields it from such harmful substances as water, calcium chloride, sodium chloride, oil, grease and other forms of dirt. If the retractor and the belt are not so protected, they rapidly become dirty, unsightly and ultimately unusable. The substances rapidly deteriorate the stitching at the attachments of the webbing to the anchor and the buckle. At best, this is normally the weak point of the belt. Any weakening at this point is therefore a serious matter. This invention eliminates this problem. This is in addition to the fact that the corrosive chemicals which may otherwise make contact with the retractor can quickly render it inoperative. This protective feature is an important and substantial contribution to vehicle belt safety.

This invention also acts as a silencer. This is becoming more important as self-locking and ratchet type retractors are being more widely adopted. These mechanisms are frequently noisy. This housing materially reduces this problem. The long neck or web guide portion of the housing contains a substantial length of webbing which never has to be wound onto the retractor. This webbing must be provided to accommodate the height of the seat from the vehicle floor. However, by storing it in the guide portion of the housing rather than on the retractor, the size and bulk of the retractor can be substantially reduced. This is particularly significant when it is realized that the belt section retained in the neck guide is the double thickness overlapped belt portion adjacent the connector. If this rather stiff, thick double belt portion must be wound onto the retractor, the retractor spring must have a substantially greater wind up force. This stronger spring force may cause the belt to be inadvertently extended less than its full length during use, thereby raising a real safety problem. This construction is important therefore in many vehicles where space to locate the retractor is minimal and is important for safety purposes.

The invention also holds the retractor and the belt in a convenient position for the user. Thus, it encourages the use of the belt, and to this extent, promotes safety. It conceals the retractor mechanism in a housing which can be colored and shaped to match the decor of the vehicle. It, thus, makes the entire unit more attractive, and to this extent, also encourages the use of safety belts. This concealment protects the mechanism from dust, dirt, chemicals, etc.

It provides a housing or cover for the retractor and the end of the retracted safety belt which is durable, will not injure personnel and will not mark or injure clothing. At the same time, it is relatively inexpensive and by reason of the fact that it greatly increases the life of both the retractor and the belt, it effects in the long run a considerable savings in over-all costs.

These and other objects and purposes of this invention will be understood by those acquainted with the engineering and installation of safety belts upon reading the following specification and the drawings.

In executing the invention, there is provided a housing having a lower portion enlarged to seat over and largely envelop the retractor mechanism. The housing also has an upper portion which provides a guide for the web of the safety belt. The inner opening of throat through the upper portion is such as to just let the web of the belt slide through. The throat guides the belt and positions it properly as the belt is rewound on the retractor. The upper portion also provides a stop and seat for the buckle at the end of the belt when the belt is fully retracted and in storage. The housing is held against travel with the belt, but does not itself carry any of the load which is imposed upon the belt since this is transmitted directly from the retractor mechanism to suitable anchor means securing the retractor to the vehicle structure. The housing is molded as a single integral unit from a scuff resistant, synthetic, resinous material. This material may be rigid or it may have a limited degree of flexibility, i.e. with sufficient rigidity to support both its own weight and the weight of the webbing and buckle. Such material should have a significant degree of plastic memory.

Figure 1:
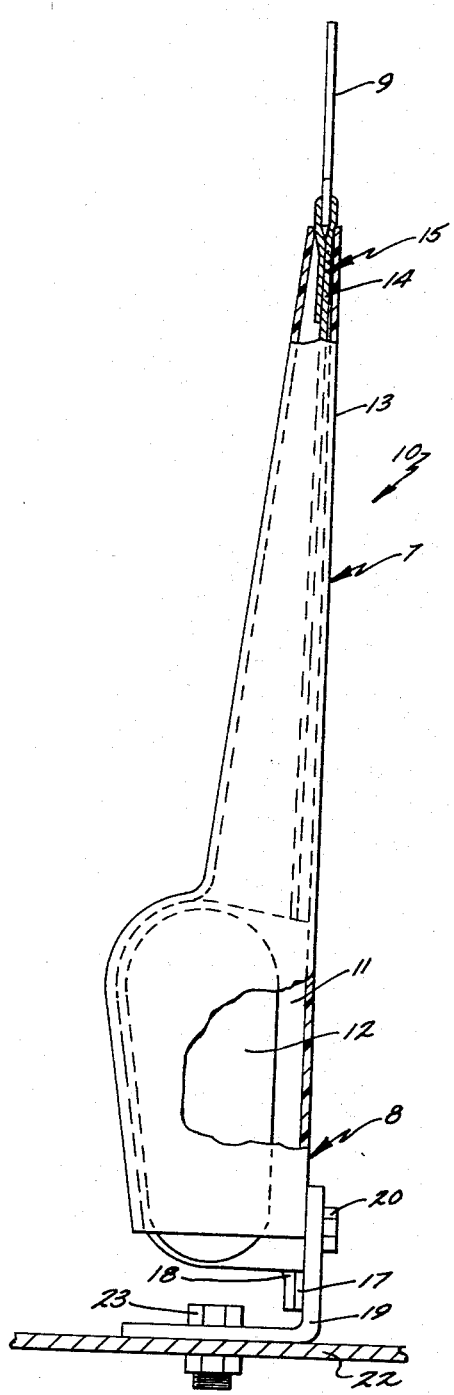
FIG. 1 is a partially broken, side elevation view of this invention.
Figure 2:
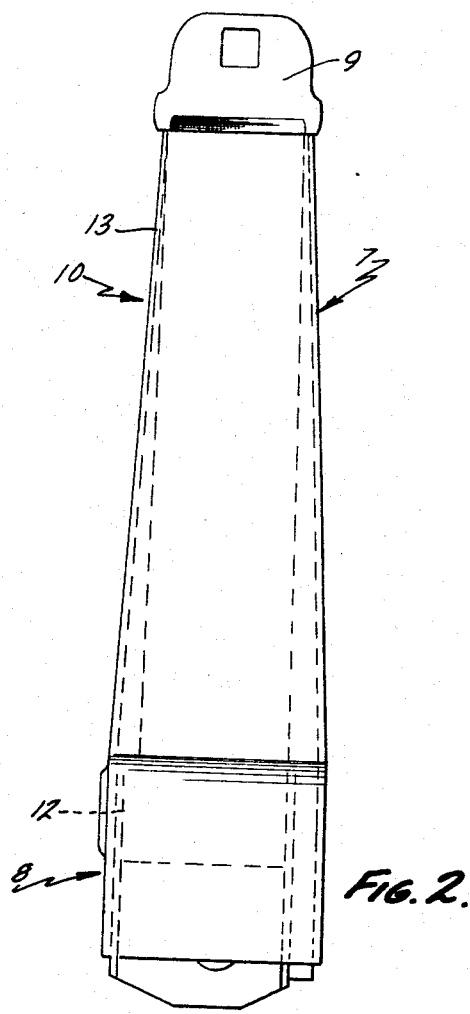
FIG. 2 is a front elevation view of the invention.

Referring specifically to FIG. 1, the numeral 10 indicates a housing having an upper portion 7 and a lower portion 8. The lower portion 8 is an enlarged area forming an interior chamber 11 of a size to receive and largely envelop the retractor mechanism 12. Projecting upwardly from the chamber 11, the upper portion of the housing forms an elongated stem-like guide tube 13 for the web 14 of the safety belt. The upper end of the guide tube 13 is open and forms a throat portion 15 of a size which is just sufficient for the belt to slide through. The throat controls the belt and prevents it from entering the tube and retractor while twisted. Thus, it properly positions and aligns the belt ready to be rolled up on the retractor 12. The free end of the belt 14, as illustrated in FIGS. 1 and 2, is equipped with a connector such as the keeper plate 9 which is wider than the web of the belt. The edges of the keeper plate connector, as is shown in FIG. 2, are wider than the throat 15 and thus, are stopped by the upper end of the guide. Thus, this upper end acts as a stop and positive control limiting the retraction of the safety belt.

Figure 3:
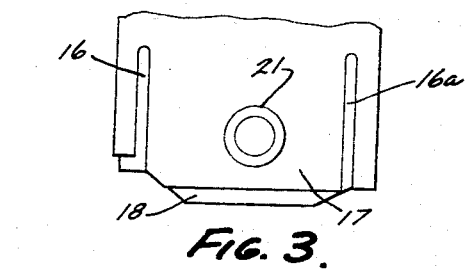
FIG. 3 is a fragmentary view of the lower end of the rear wall of the invention.

The back wall of the housing has a pair of slits 16 and 16a opening through the bottom edge of the back wall and extending up the back wall a short distance (FIG. 3). These slits create a central flap 17 integral with the back wall of the housing only along its upper edge. The retractor has an attachment flange 18 which seats against the flap 17. The entire unit is mounted by means of an anchor bracket 19 secured to the retractor by the bolt 20. The bolt 20 passes through the opening 21 in the flap 17. The anchor bracket 19 may be secured to any suitable portion of the permanent structure of a vehicle such as the floor 22 by suitable means such as the bolt 23 (FIG. 1). It will be seen by this arrangement that the load imposed upon the belt by an emergency will be transmitted directly from the belt to the retractor and from the retractor to the bracket 19. Thus, the housing 10 merely conceals and protects, but is not structural insofar as the function of the safety belt is concerned. By passing the bolt 20 through the opening 21 in the flap 17, the housing is secured, and thus, held against any tendency to travel with the web of the belt as it is extended.

Figure 4:
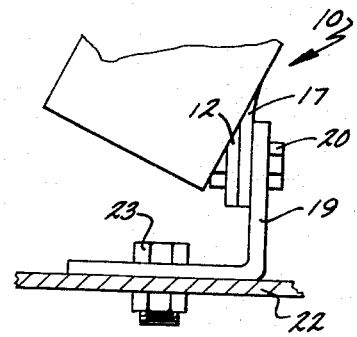
FIG. 4 is a fragmentary view of a modified mounting for this invention.

The flap 17 serves a double purpose. It permits the bottom opening to be enlarged to admit the body of the retractor. This facilitates assembly. Where the anchor bracket 19 is attached to the retractor along a plane inclined to the central axis of the housing, it permits the attachment to be made as suggested in FIG. 4. In those cases in which the retractor may be inserted without enlargement of the opening and the angle between the retractor and the anchor bracket is minor, the slits 16 and their function can be eliminated.

Various materials may be used for the housing. In one form, the housing is molded of a material of sufficient stiffness that it can support its own weight, and also, that of the buckle. For this type of housing, a preferred material is a semi-rigid, synthetic resin as for example, a molded vinyl resin having a reasonably heavy wall thickness. This type of material is desirable because it can be provided with a neat and attractive appearance. It can be made in any color to blend with the decor of the vehicle's interior. It is rigid enough to support the buckle and the retractor, yet has sufficient give that should it be struck a sharp blow, such as would result from a kick, it will flex and return to its original shape without mark or injury. The vinyl resins are highly resistant to scuffing, moisture, lubricants and the corrosive chemicals frequently encountered in the vehicle use. Thus, it is durable and will retain its attractive appearance over a substantial life span. It will also be recognized that there are synthetic resinous materials other than vinyls which will meet these specifications.

In other types of installations, a completely rigid material may be used. When this type of material is used the housings may be injection molded. The materials should have the characteristics of high impact and scuff resistance, as well as being impervious to the chemicals normally encountered in vehicle use. It should also be capable of being molded in colors which will blend with vehicle decor. Examples of suitable materials are polyethylene and a copolymer commonly referred to as ABS (acrylonitrile butadiene styrene). There are even situations in which the housing may be fabricated of metal, such, for example, as cast aluminum.

As will be noted from FIGS. 1 and 2, the elongated stem like guide tube 13 projects upwardly a substantial distance from the retractor. As such, it positions the buckle end of the belt in a convenient location to be grasped by the user. It positions it just below the level of the seat where it will not interfere with movement in and out of the car, but at the same time, it is at a sufficiently elevated position that the person does not have to reach down into the slot between the seat and the vehicle door to grasp the end of the belt. It is important that the material from which the housing is made have sufficient rigidity that it will support the buckle in this position and hold it not only against the weight of the buckle, but also retain it against the downward bias exerted by the retractor.

The rigid upstanding guide tube has another very important function in addition to the protection of the webbing and the guide characteristic, and that is its safety feature. More specifically, since the upper outer edge serves as a stop surface for the retracted connector, and the tube retains the thick doubled belt end attached to the connector, this doubled end need not be wound onto the retractor. Hence, the retractor spring need not be extra strong to wind this stiff belt portion onto it. The belt can therefore be easily extended its full length against the bias of the spring, thereby preventing inadvertent extension of the belt less than its full length during use.

Figure 7:
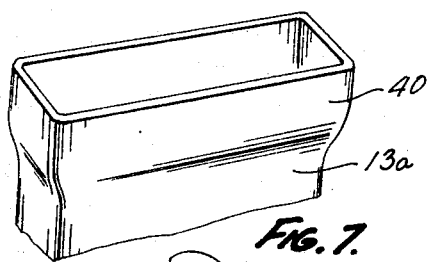
FIG. 7 is a fragmentary, oblique view of a modified buckle receiving terminus for the housing.
Figure 11:
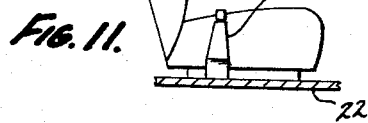
FIG. 11 is a schematic view of a vehicle seat equipped with this invention.

If it is desired to provide increased concealment for the buckle on the end of the belt, this may be done by flaring the upper end of the guide tube 13. Such an arrangement is illustrated in FIG. 7 in which the guide 13a has a flared upper end 40, providing a shallow pocket which receives the lower portion of the buckle. If the keeper end of the buckle is to be stored in this pocket, the pocket can be rather narrow. If, however, the latch end of the buckle is to be stored in the pocket, the pocket will be wider since the latch end is normally considerably thicker. The depth of the pocket should be such that a sufficient portion of the buckle projects from the pocket to make is reasonably easy to grasp.

Figure 5:
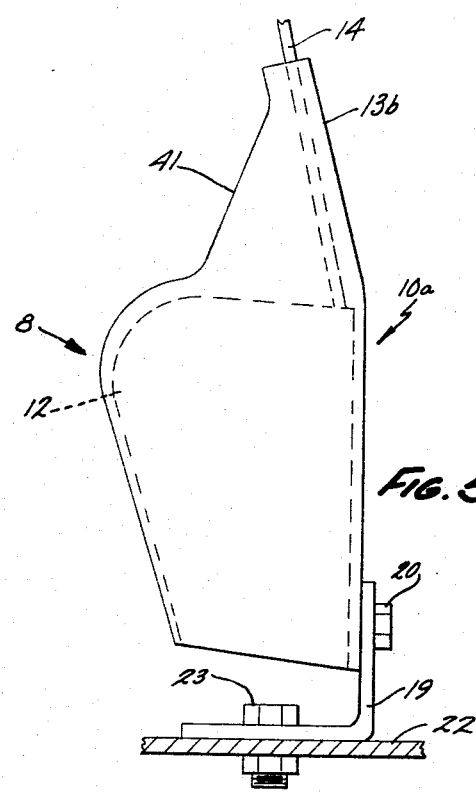
FIG. 5 is a side elevation view of a modified form of the invention.
Figure 6:
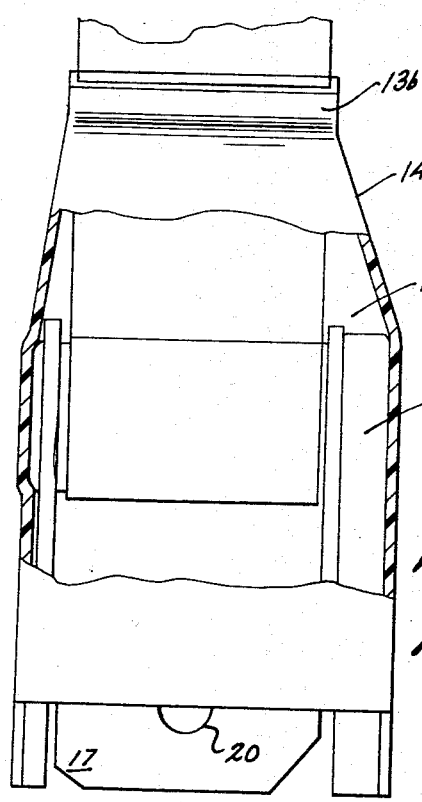
FIG. 6 is a partially broken, front elevation view of the form of the invention illustrated in FIG. 5.

FIGS. 5 and 6 illustrate a modified form 10a of the housing in which the guide tube 13b is quite short. In this case, the portion 8 of the housing forming the encasement for the retractor mechanism 12 remains the same. Between the lower portion 8 and the guide tube 13b, a short transition section 41 is provided. This has both the effect of providing more room for the belt, and of reinforcing the guide portion 13b. The mounting of the housing 10a is identical to that of the housing 10. It may also have the back flap 17 (illustrated in FIG. 3) to facilitate its assembly to the retractor and its attachment to the anchor bracket 19.

Figure 8:
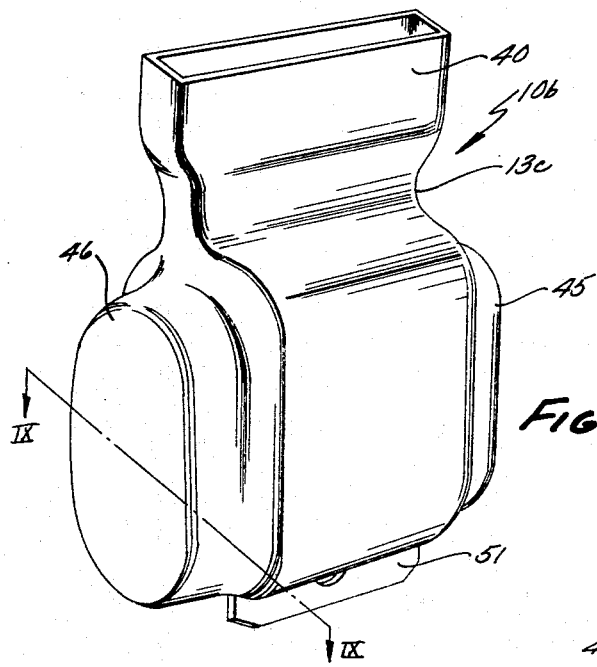
FIG. 8 is an oblique view of a further modified form of this invention.
Figure 9:
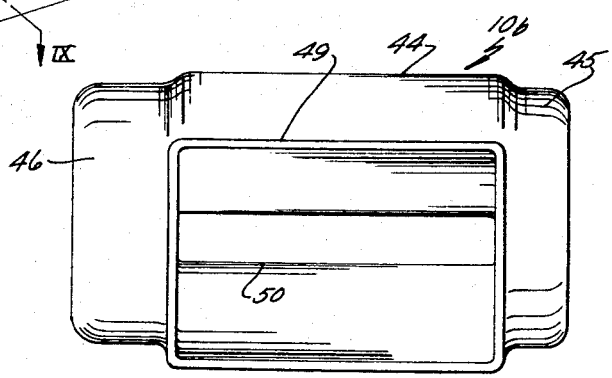
FIG. 9 is a bottom view of the housing shown in FIG. 8.
Figure 10:
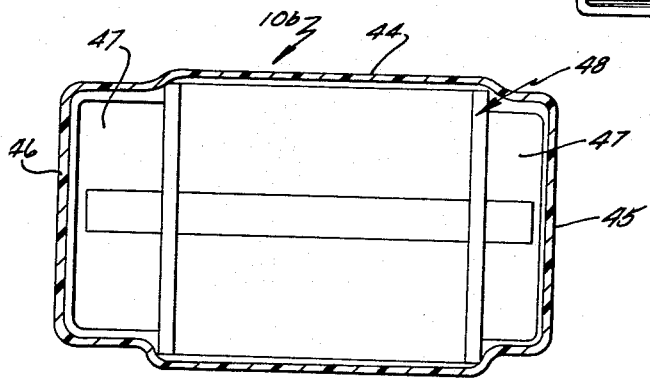
FIG. 10 is a central sectional view taken along the plane X—X of FIG. 8.

FIGS. 8, 9 and 10 illustrate a further modification of the housing. In this case, the housing 10b has an enlarged lower retractor receiving portion 44, a short guide tube portion 13c and a flared pocket portion 40 at the top. It will be noted that the sides of the retractor receiving portion are formed outwardly in a pair of convex wings 45 and 46 forming auxiliary portions of the main chamber to receive the actuating mechanism 47 of the retractor 48. The bottom opening 49 of the housing is smaller than the retractor as is indicated in FIG. 9. The retractor 48 is inserted into the housing through the bottom opening. First, the belt is passed through the throat 50 of the guide portion 13c. The retractor is then forced in by enlarging the bottom opening 49 sufficiently to permit the retractor to pass through. In this particular construction, the non-rigid material is used. Despite the fact that such material is strong enough to support the weight of the belt and the buckle, it does have sufficient elasticity to permit this to be done. Further, in the case of certain resins such as the vinyls, the elasticity of the material can be temporarily increased to a significant degree by subjecting the material to an elevated temperature such as about 150° F. When the material is again cooled to normal temperatures, it will regain the required stiffness. In this case, the unit is mounted by attaching the anchor plate 51 of the retractor directly to the vehicle. No portion of the housing is secured to the anchor means. The housing is held in place by the fact that it envelops the retractor 48 which, of course, is held stationary by its anchorage to the vehicle.

Figure 12:
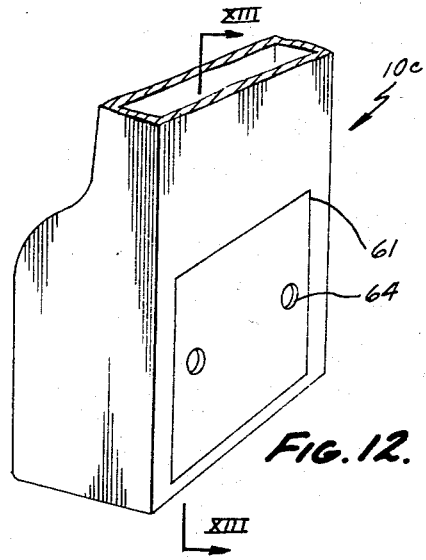
FIG. 12 is a fragmentary perspective view of a modified form of this invention.
Figure 13:
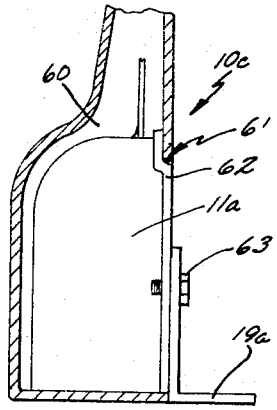
FIG. 13 is a section elevation view taken along the plane XIII—XIII of FIG. 12.

FIGS. 12 and 13 show a modification of the invention in which the housing 10c is basically similar to the housing 10. However, the retractor chamber 11a is closed at the bottom by a wall 60 and an access and mounting opening 61 is provided in the back wall. The retractor 62 is inserted through this opening and is seated in the chamber 11a. The retractor is secured by an anchor bracket 19a which attaches to the retractor base by bolts 63 mounted in the threaded openings 64 in the retractor base. It will be recognized that a number of different mountings may be made for the retractor without affecting the construction of the housing.

Figure 14:
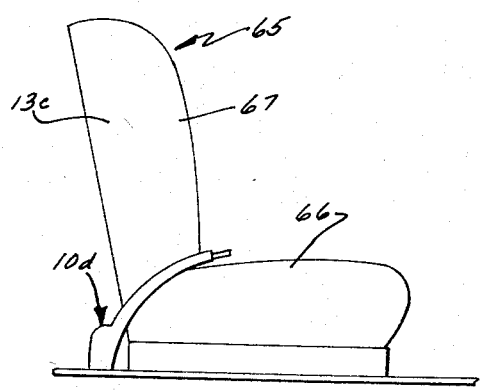
FIG. 14 is a somewhat schematic sectional elevation view of a seat illustrating this invention modified for use between the seat and back cushions.

FIG. 14 illustrates this invention mounted to receive the portion of the safety belt installed at the center of the full width type seat 65. The housing 10d is the same as either housings 10 or 10c except that the upper or guide tube portion 13c is curved to extend through the joint between the seat and back cushions 66 and 67. The curved guide tube 13c provides a positive track for the belt webbing eliminating the friction of sliding between the cushions. It also prevents twisting of the webbing in this area. This is important because such twisting is generally inaccessible and causes serious difficulty with proper retraction. It also materially shortens belt life.

Figure 15:
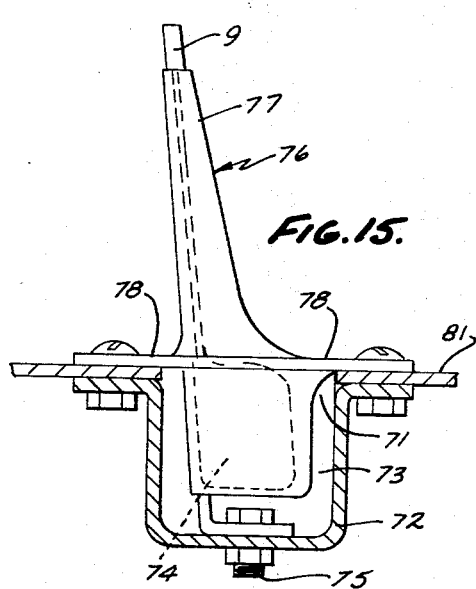
FIG. 15 is an elevation view showing the under floor casing in section of this invention adapted to partially recessed installation.
Figure 16:
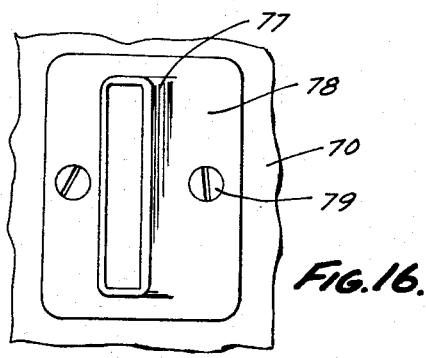
FIG. 16 is a fragmentary plan view of the structure illustrated in FIG. 15.

FIGS. 15 and 16 illustrate this invention applied to a partially recessed installation. In this case, the vehicle floor 70 (this could be either the floor pan itself or the top of a hollow, raised sill) has an opening 71. Beneath the floor is a jacket 72 which may partially or entirely enclose the well area 73 within it. The retractor 74 is seated within this well, and in the particular embodiment illustrated is bolted at 75 to the bottom of the jacket. Since, in this instance, the jacket mounts the retractor, it must be structural.

The housing 76 is similar to the housing 10 except at approximately the point where the retractor chamber merges into the webbing guide tube 77, the housing has an outwardly extending flange 78. This flange 78 projects beyond all edges of the opening 71. When the housing 76 is mounted, the flange seats over the opening 71 both sealing and concealing it. Thus, it prevents dirt, moisture and other foreign substances such as corrosive chemicals from reaching the retractor. In the particular embodiment shown, the installation bolts 79 secure both the flange 78 and the jacket 72 to the floor 70. It will be recognized that separate bolts may be used to secure the jacket and suitable fasteners such as sheet metal screws used to hold down the flange 78.

As in the case of the other forms of this invention, the top of the guide tube 77 may be flared to receive the latch portion of a buckle as is suggested in FIG. 7. The latch connector can thus be held upright in this enlarged or flared pocket to keep it from dangling loose on the end of the neck guide to rattle against adjacent vehicle parts.

Figure 17:
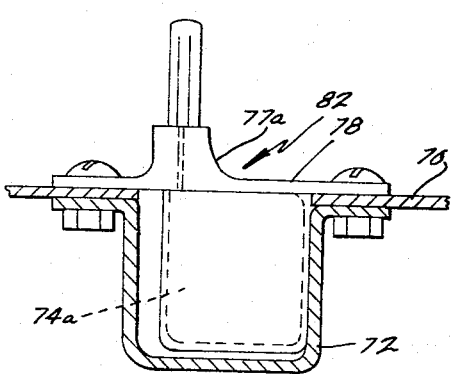
FIG. 17 is a fragmentary sectional elevation view similar to FIG. 15 showing an additional modification of this invention.
Figure 20:
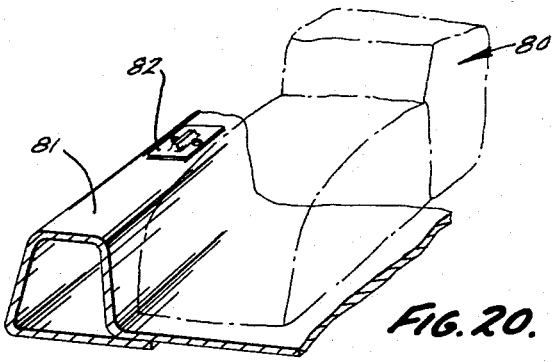
FIG. 20 is a fragmentary sectional view showing the seats in phantom of a high-silled vehicle equipped with the form of this invention illustrated in FIG. 17.

FIG. 17 illustrates the application of this invention to a situation in which the vehicle seats are deeply recessed creating a high sill. This environment is illustrated in FIG. 20 in which the top of the seat 80 (illustrated in phantom for clarity) is also level with the top of the raised sill 81. In this arrangement, the housing 82 protrudes only slightly above the sill.

The housing 82 is similar to housing 76 except for the fact that the tubular upper end 77a is greatly reduced in height forming just a short throat portion above the flange 78. However, the housing retains the narrow belt confining throat to guide and align the belt as it is extended and retracted.

Figure 18:
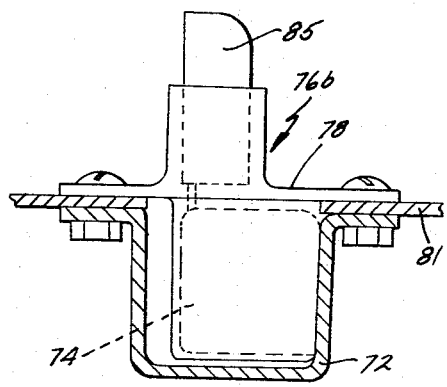
FIG. 18 is a view similar to FIG. 17 showing a further modification of this invention.
Figure 19:
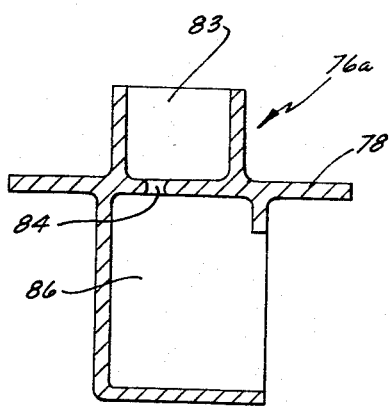
FIG. 19 is a central sectional view through the housing of FIG. 18.

FIGS. 18 and 19 illustrate the housing of FIG. 17 modified to receive the latch portion of the buckle. In the housing 76a, the portion of the housing above the flange 78 is flared to form a cup 83 to receive and hold the latch portion 85 of a safety belt. The bottom of the cup 83 communicates with the retractor chamber 84 through a narrow slit-like throat 86 to straighten and guide the belt.

It will be noted that in both housings 76a and 80, the side wall of the retractor chamber is open rather than the bottom. Thus, the retractor 74a is secured to the side wall of the jacket 72. This same arrangement can be adapted to the housing 76.

Irrespective of the particular form of this invention which is used, it materially increases the durability, and safety of the belts. It also encourages their use. Thus, it is an important contribution to vehicle safety.

It will be understood that throughout this description and in the following claims, unless specifically designated otherwise, the terms "buckle" or "connector" is intended to apply to both parts of the connector assembly such as the conventional two piece buckle assembly or the equivalent. Thus, the terms are intended to embrace either the latch or keeper portions of the buckle or connector assembly.

Having described my invention in its preferred embodiment and several modifications of the preferred embodiment, that which I claim to be patentable is described in the hereinafter appended claims.

I claim:
1. In combination, a vehicle safety belt, said belt having a web portion and a connector portion, said web portion including a thick doubled portion adjacent said connector portion, a retractor for said belt biasing said belt into rolled-up storage position, a storage housing for said belt and retractor, said storage housing having a hollow body member, the upper portion of said body member being tubular and forming a throat at the upper end thereof of a size sufficient only to pass said web of said belt, the end of said upper portion forming a stop for said connector portion to limit retraction of said belt and cause said thick doubled portion to be retained therein when retracted; the lower end of said body member being enlarged to form a retractor receiving chamber substantially enveloping said retractor, said chamber having an opening through which said retractor is received into said chamber; the upper end of said retractor chamber communicating with said upper portion and said belt extending therethrough to said retractor; anchor means for attaching said retractor to a supporting surface; and said body member being a single integral piece of a material having limited flexibility, and yet sufficient rigidity to support itself and the weight of the safety belt in a generally upright position.

2. A storage housing for safety belt retractors as recited in claim 1 wherein said tubular upper portion is elongated and the sides thereof converge upwardly to form a throat at the upper end thereof of a size sufficient only for passage therethrough of the belt.

3. The combination recited in claim 1 wherein one wall of said retractor chamber has a pair of spaced slits extending a portion of the length thereof and to the bottom edge of said wall and forming a flap integral with said wall at the top of said flap; a fastener securing said retractor to said anchor means, said fastener passing through said flap and holding said housing against travel with said belt when the belt is extended, said flap being bendable to permit enlargement of said bottom opening during insertion of said retractor therethrough.

4. The combination recited in claim 1 wherein said upper portion extends upwardly beyond said throat and is flared outwardly to form a cup for receiving said connector portion of said safety belt.

5. The combination recited in claim 1 wherein said retractor receiving opening into said retractor chamber is smaller than said retractor and said body member is stretched to pass over said retractor, the lower edges of said body member partially enveloping the bottom of said retractor and holding said body member against upward movement relative to said retractor.

References Cited by the Examiner
UNITED STATES PATENTS
2,725,097 11/1955 Thoreson _____ 297—388
2,964,100 12/1960 McCall _____ 297—388
3,046,056 7/1962 Greene et al. _____ 297—385
3,065,027 11/1962 Misslich et al. _____ 297—388
3,125,374 3/1964 Bissell _____ 297—388
3,126,228 3/1964 Greene et al. _____ 297—385
3,163,467 12/1964 Deneau _____ 297—388
3,175,862 3/1965 Robbins _____ 297—385

References Cited by the Applicant
UNITED STATES PATENTS
2,488,858 11/1949 Franz.
2,830,655 4/1958 La Lande.
2,945,275 7/1960 Almeter.

FRANK B. SHERRY, *Primary Examiner.*

R. B. FARLEY, J. S. PETRIE, *Assistant Examiners.*